(12) United States Patent
Ishizuka et al.

(10) Patent No.: US 11,447,399 B2
(45) Date of Patent: Sep. 20, 2022

(54) METHOD FOR PRODUCING NICKEL LITHIUM METAL COMPLEX OXIDE POWDER OF SMALL PARTICLE SIZE

(71) Applicant: Umicore, Brussels (BE)

(72) Inventors: Hiroaki Ishizuka, Kumamoto (JP);
Tomomi Fukuura, Kumamoto (JP);
Miwako Nishimura, Kumamoto (JP);
Hironori Ishiguro, Kumamoto (JP)

(73) Assignee: UMICORE, Brussels (BE)

( * ) Notice: Subject to any disclaimer, the term of this patent is extended or adjusted under 35 U.S.C. 154(b) by 165 days.

(21) Appl. No.: 16/303,349

(22) PCT Filed: May 26, 2017

(86) PCT No.: PCT/JP2017/019724
§ 371 (c)(1),
(2) Date: Nov. 20, 2018

(87) PCT Pub. No.: WO2017/204334
PCT Pub. Date: Nov. 30, 2017

(65) Prior Publication Data
US 2020/0198987 A1 Jun. 25, 2020

(30) Foreign Application Priority Data
May 27, 2016 (JP) .............................. JP2016-105788

(51) Int. Cl.
*C01G 53/00* (2006.01)
*H01M 4/525* (2010.01)
(Continued)

(52) U.S. Cl.
CPC ............ *C01G 53/42* (2013.01); *H01M 4/525* (2013.01); *H01M 10/0525* (2013.01);
(Continued)

(58) Field of Classification Search
CPC .... H01M 4/525; H01M 10/0525; C01G 53/42
(Continued)

(56) References Cited

U.S. PATENT DOCUMENTS

2012/0094177 A1\* 4/2012 Honoki ............... H01M 4/5825
429/211
2012/0276454 A1\* 11/2012 Mori ...................... C01G 53/42
429/223
(Continued)

FOREIGN PATENT DOCUMENTS

JP 2001196097 A 7/2001
JP 2003068300 A \* 3/2003
(Continued)

OTHER PUBLICATIONS

"Monthly Fine Chemical" Nov. 11, 2009, p. 81 to 82, CMC Publishing Co., Ltd.
(Continued)

*Primary Examiner* — Sean P Cullen
(74) *Attorney, Agent, or Firm* — NK Patent Law

(57) ABSTRACT

[Task] To provide a preparation method of a nickel-lithium metal composite oxide powder
[Means for Resolution] In a preparation method of a nickel-lithium metal composite oxide powder having a small particle diameter, aggregation of particles and excessive crushing of particles do not occur, by performing the firing at a temperature equal to or lower than a melting point of lithium carbonate by using lithium carbonate as a lithium source, and therefore, a preparation method of a nickel-lithium metal composite oxide powder having a small particle diameter, in which fine powder or cracks of particles are not generated, is provided.

5 Claims, 11 Drawing Sheets

(51) Int. Cl.
*H01M 10/0525* (2010.01)
*H01M 4/02* (2006.01)

(52) U.S. Cl.
CPC ...... *C01P 2004/51* (2013.01); *C01P 2004/61* (2013.01); *C01P 2004/62* (2013.01); *H01M 2004/028* (2013.01)

(58) Field of Classification Search
USPC ......................................................... 429/223
See application file for complete search history.

(56) References Cited

U.S. PATENT DOCUMENTS

| | | | | |
|---|---|---|---|---|
| 2013/0134349 A1* | 5/2013 | Kagei | ................... | H01M 4/525 |
| | | | | 252/182.1 |
| 2013/0337331 A1* | 12/2013 | Mori | ..................... | H01M 4/525 |
| | | | | 429/223 |
| 2014/0106228 A1* | 4/2014 | Toya | ..................... | H01M 4/625 |
| | | | | 429/223 |
| 2014/0272592 A1* | 9/2014 | Thompkins | ......... | H01M 4/1395 |
| | | | | 429/231.8 |
| 2014/0377660 A1* | 12/2014 | Fukui | ..................... | C01G 53/42 |
| | | | | 429/223 |
| 2017/0012286 A1* | 1/2017 | Washida | ............... | H01M 4/505 |
| 2018/0331356 A1* | 11/2018 | Feaver | ..................... | C23F 1/00 |
| 2020/0083529 A1* | 3/2020 | Natsui | ................... | C01B 25/455 |
| 2020/0295351 A1* | 9/2020 | Piao | ...................... | H01M 4/133 |

FOREIGN PATENT DOCUMENTS

| | | | | |
|---|---|---|---|---|
| JP | 2004355824 A | * | 12/2004 | |
| JP | 2005324973 A | | 11/2005 | |
| JP | 2006318926 A | | 11/2006 | |
| JP | 2008147068 A | * | 6/2008 | |
| JP | 2008153017 A | * | 7/2008 | |
| JP | 5567742 B2 | * | 8/2014 | ......... H01M 4/1397 |
| JP | 2017100892 A | | 6/2017 | |
| WO | 2012131779 A1 | | 10/2012 | |
| WO | 2012164763 A1 | | 12/2012 | |
| WO | WO-2014159118 A1 | * | 10/2014 | ......... C01G 45/1221 |
| WO | WO-2016035853 A1 | * | 3/2016 | ............ H01M 4/505 |

OTHER PUBLICATIONS

ISA/JP; International Search Report and Written Opinion for International Application No. PCT/JP2017/019724 dated Aug. 1, 2017, 9 pages.
JOGMEC, "Annual Report 2015 Year ended Mar. 31", Japan Oil, Gas and Metals National Corporation, 52 pages.
"Material Flow of Lithium", Mineral Resource Material Flow, 2012, 20 pages.

* cited by examiner

【Fig. 1】
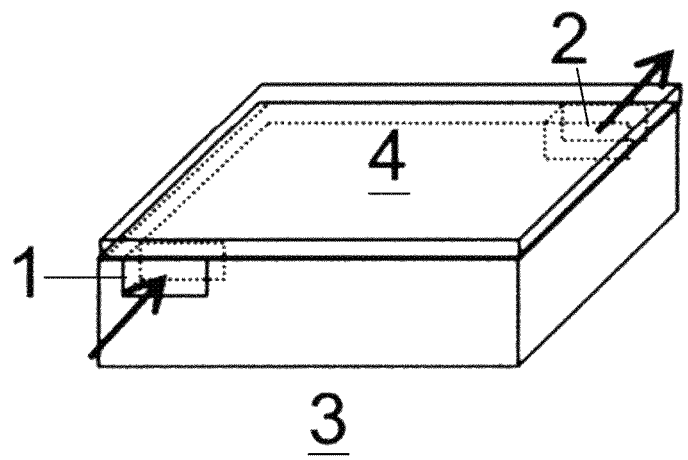
【Fig. 2】
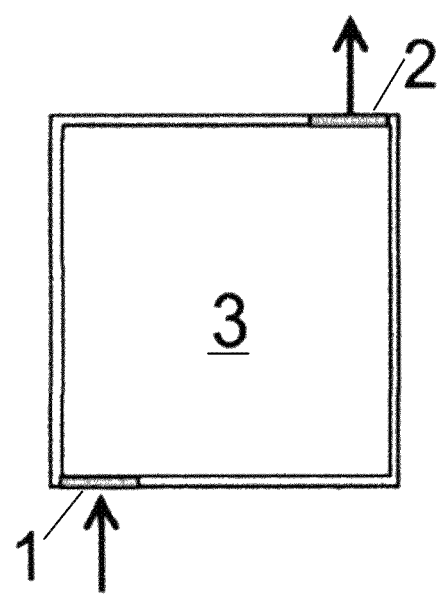

[Fig. 3]
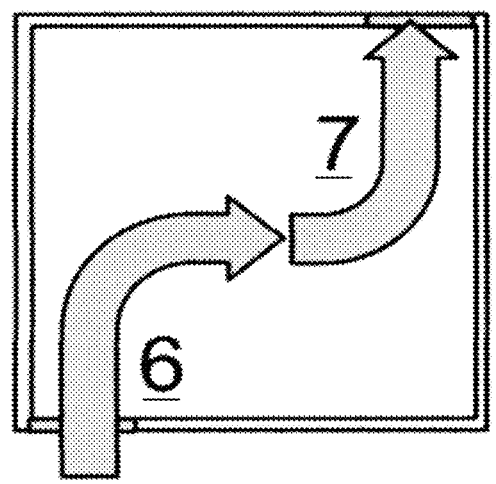
[Fig. 4]
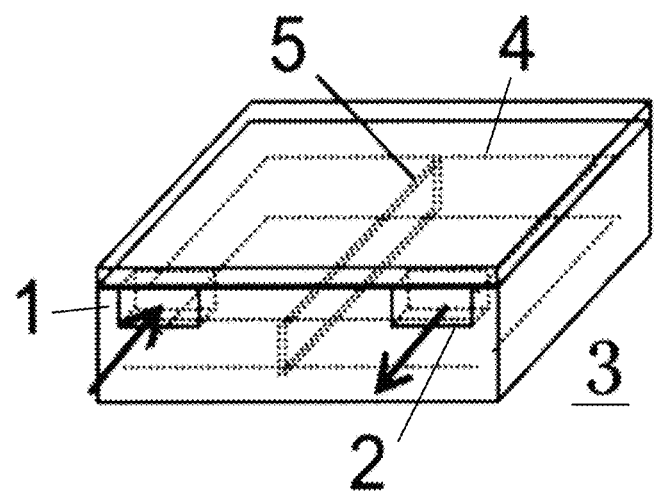

【Fig. 5】
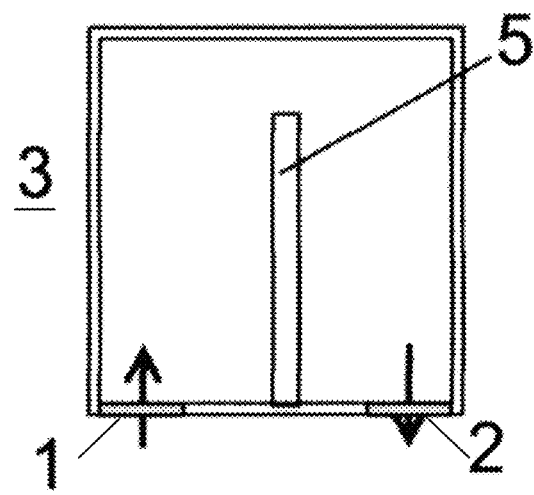
【Fig. 6】
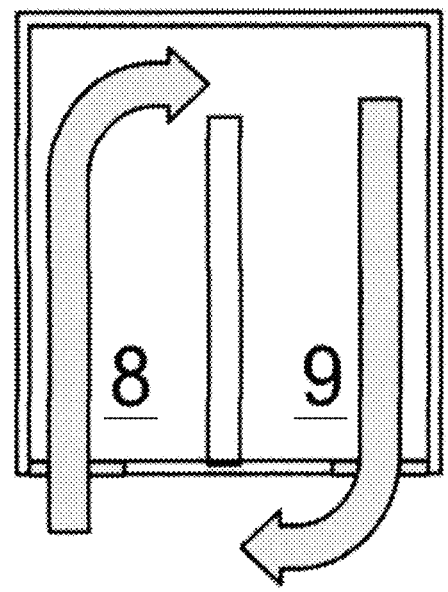

[Fig. 7]
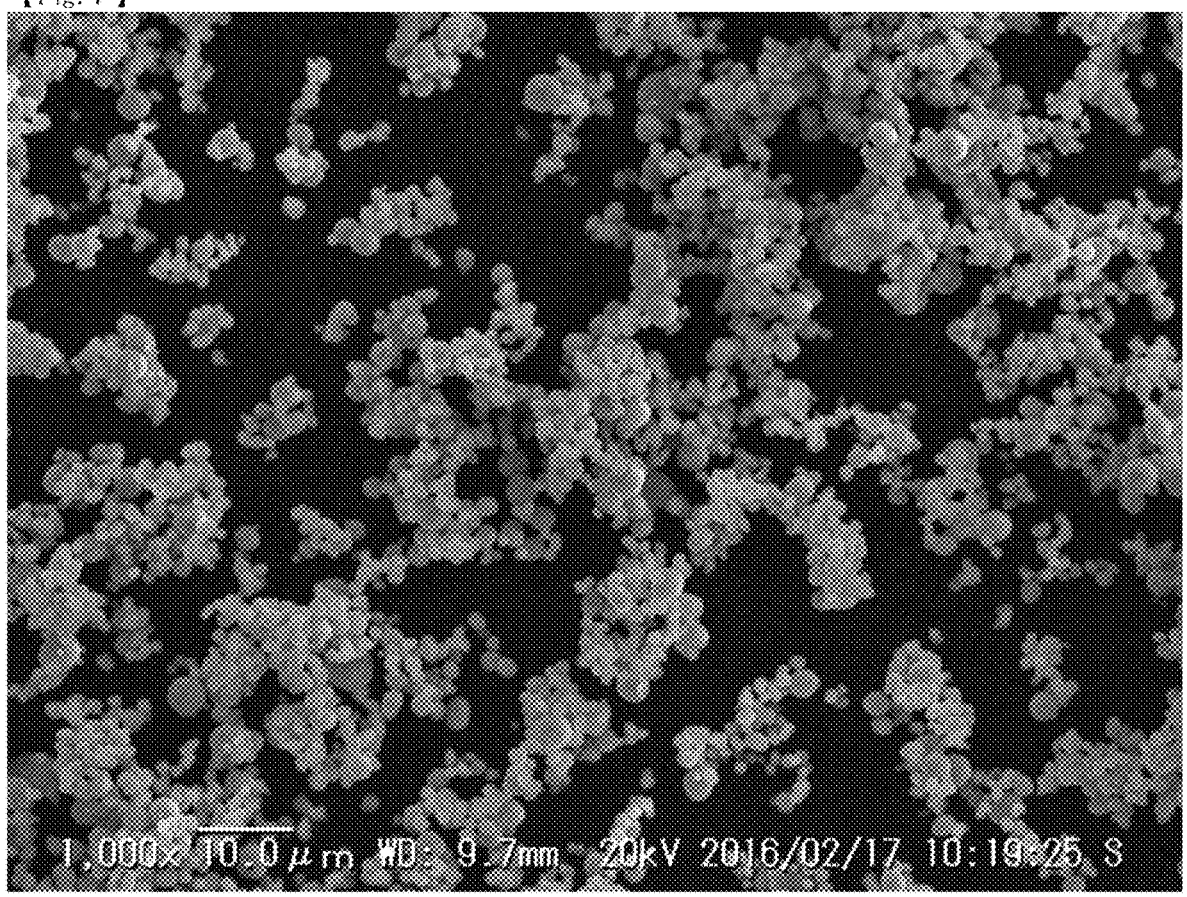

[Fig. 8]
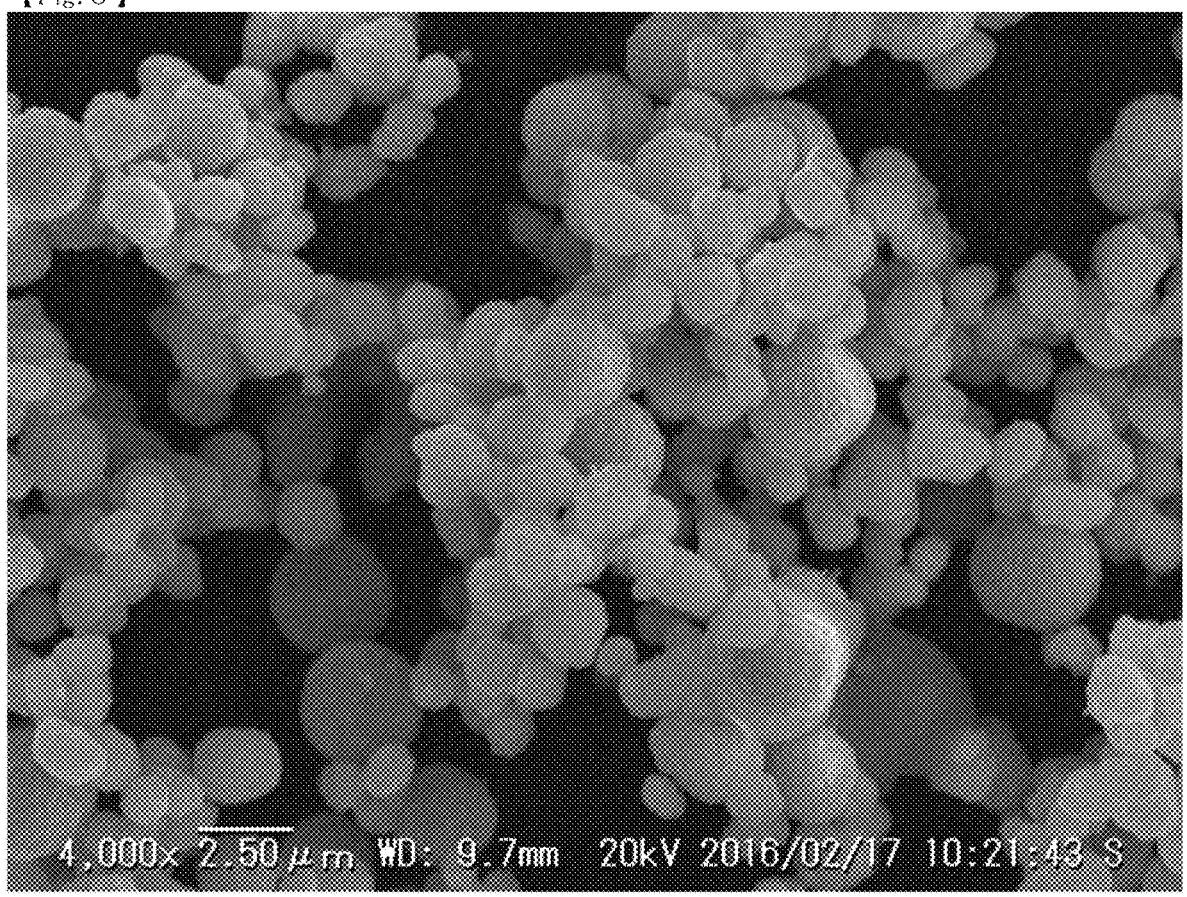

[Fig. 9]
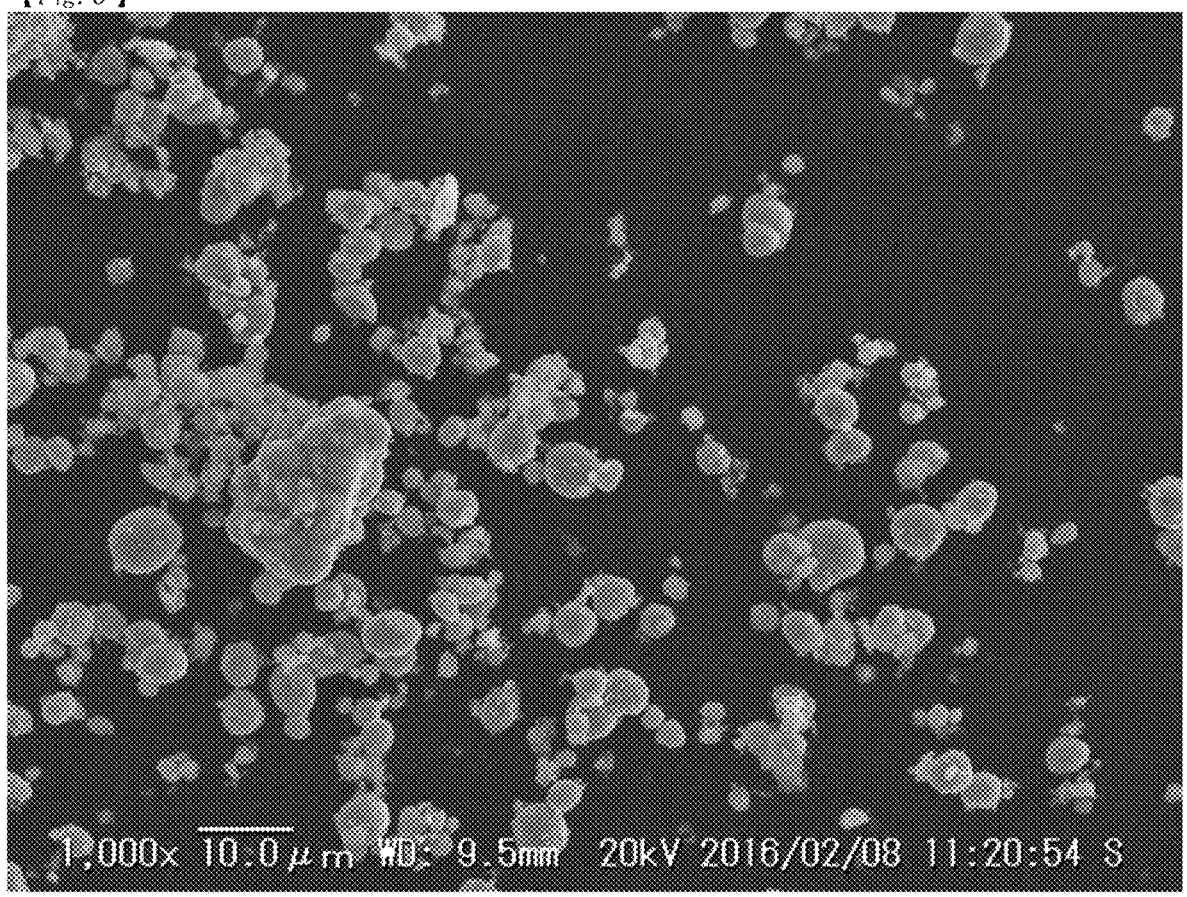

[Fig. 10]
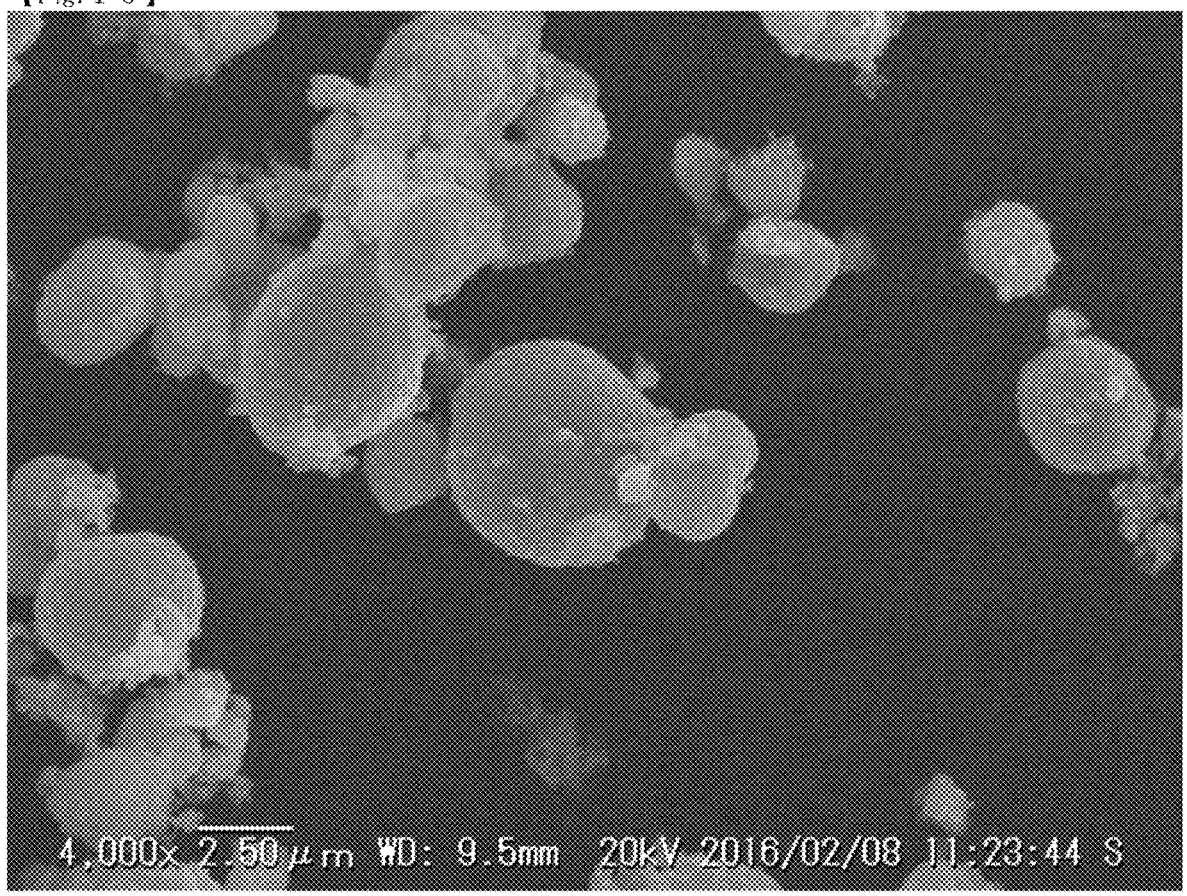

[Fig. 11]
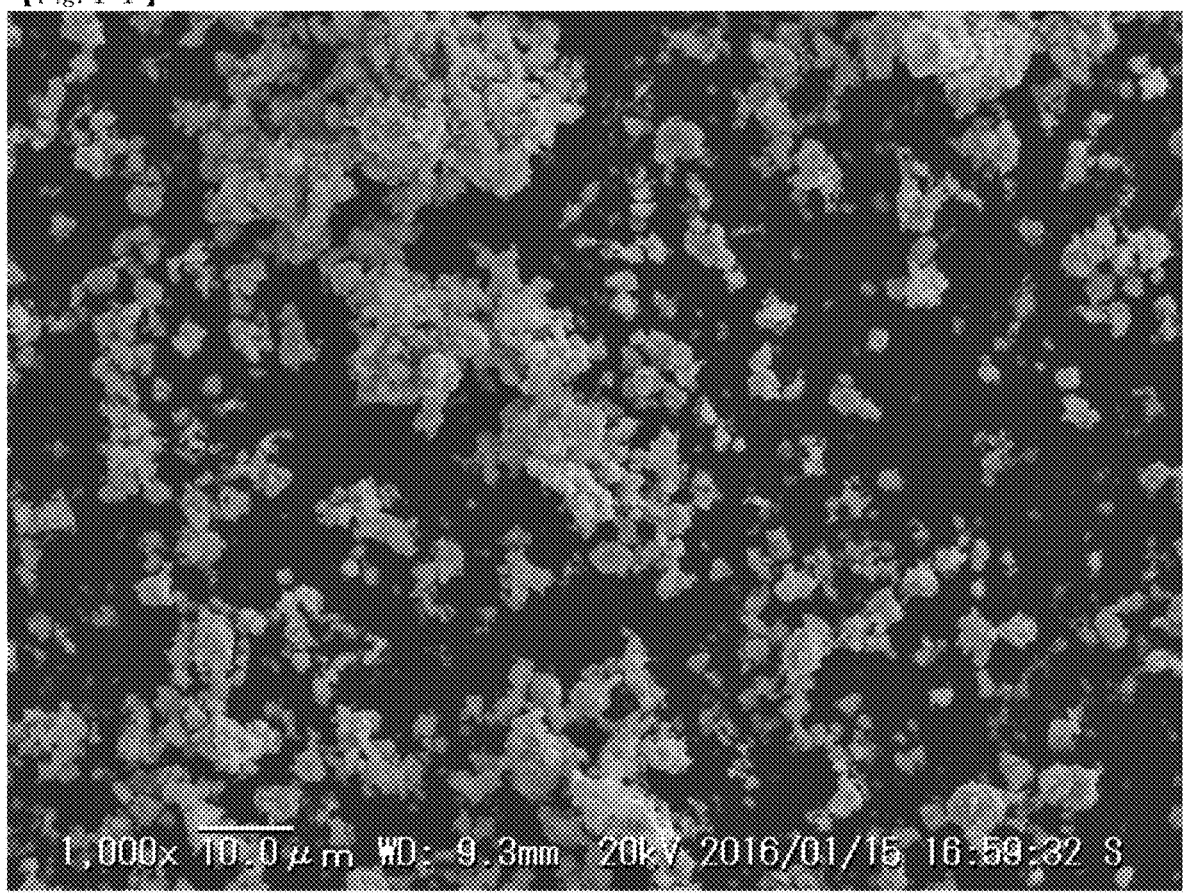

[Fig. 12]
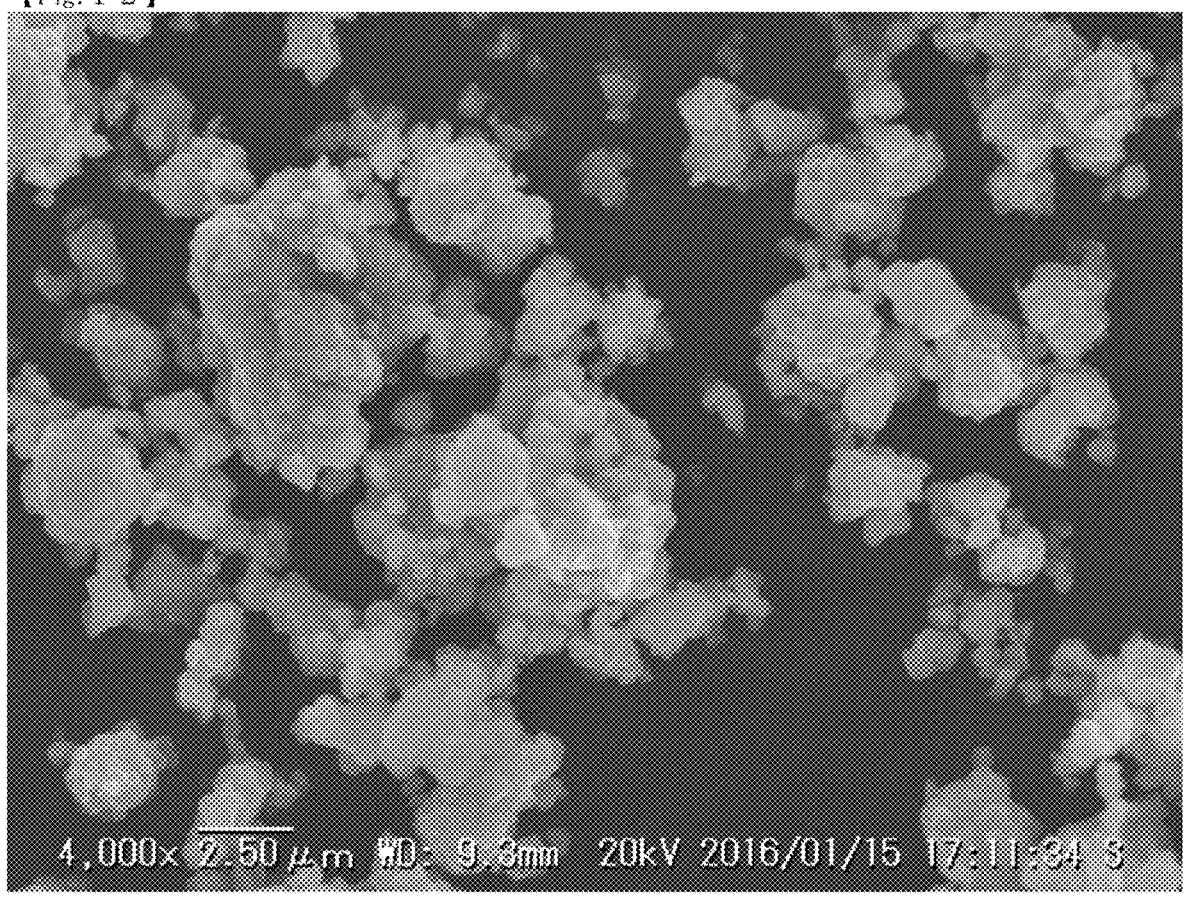

[Fig. 13]
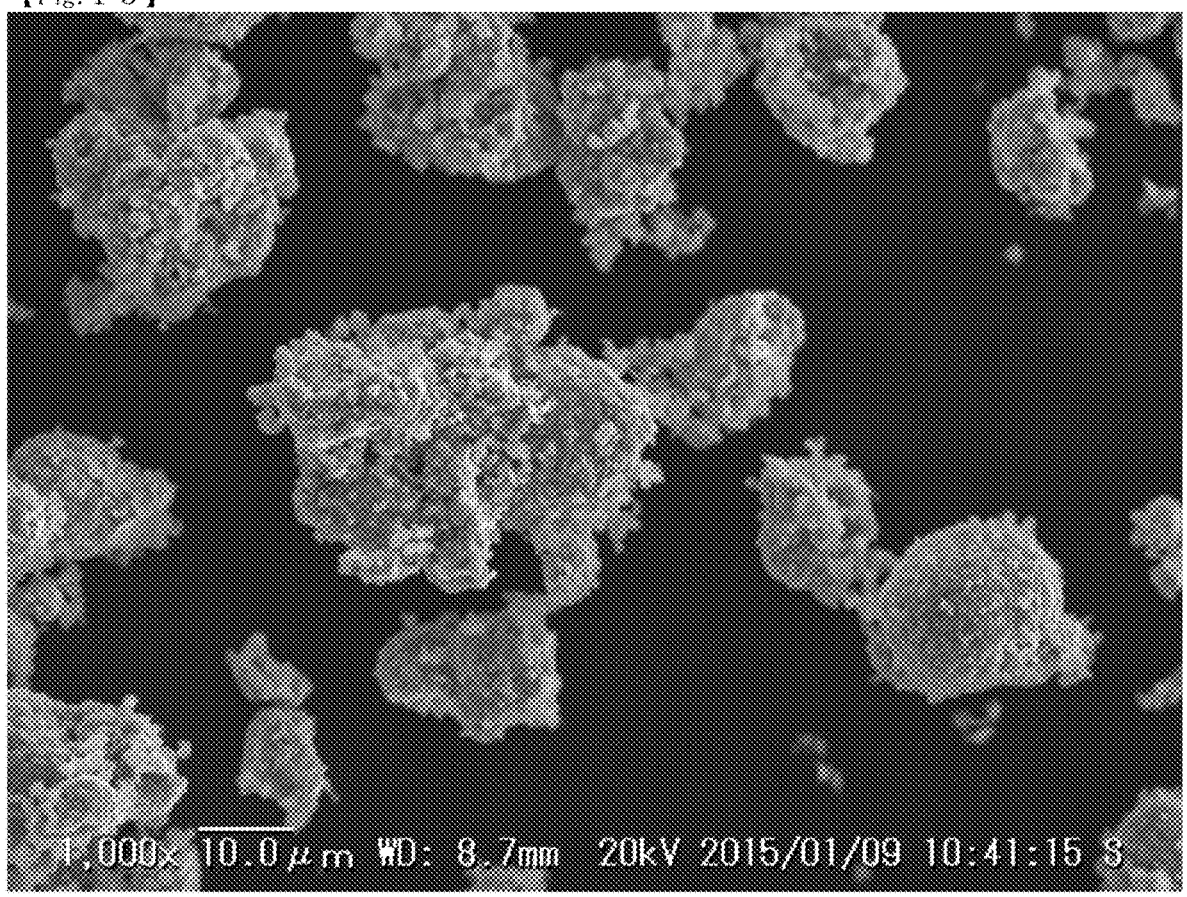

[Fig. 14]
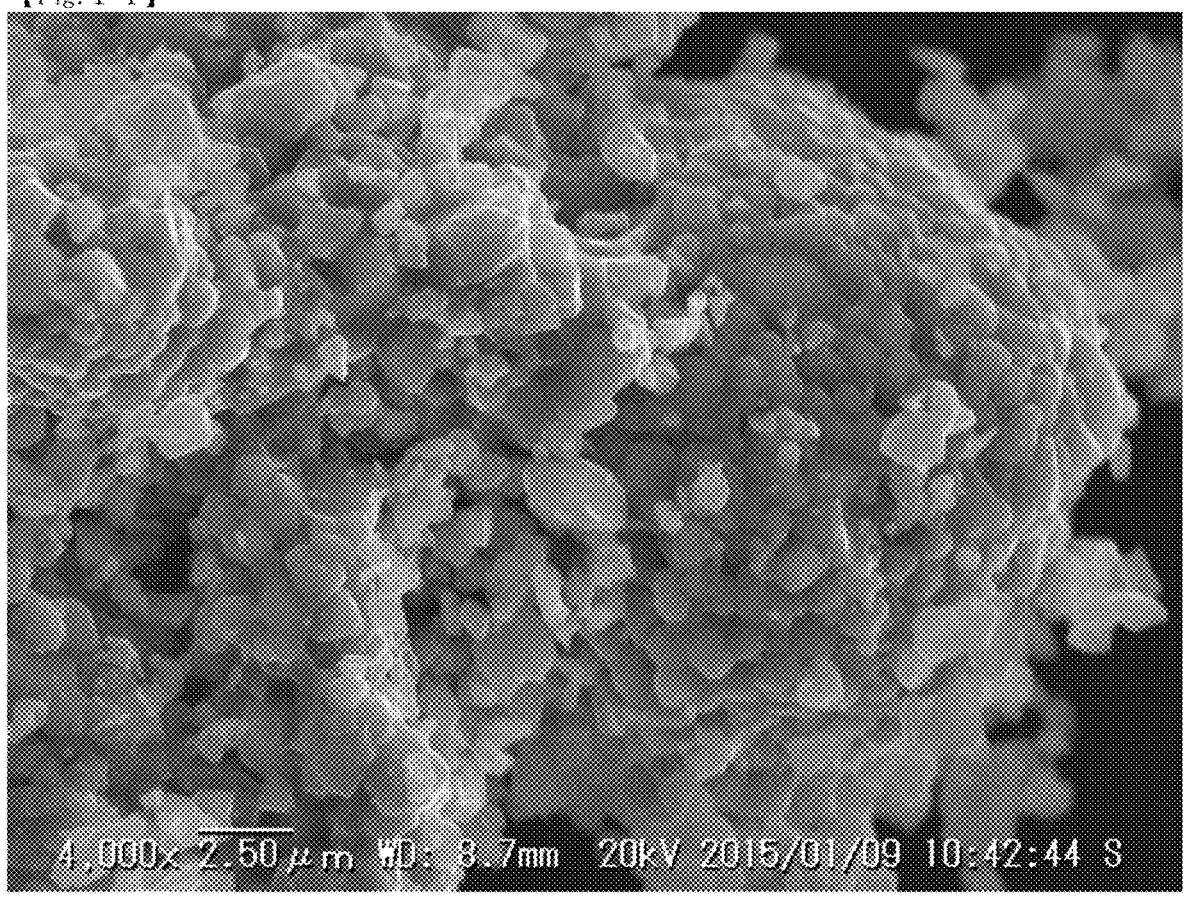

METHOD FOR PRODUCING NICKEL LITHIUM METAL COMPLEX OXIDE POWDER OF SMALL PARTICLE SIZE

CROSS-REFERENCE TO RELATED APPLICATIONS

This application is a U.S. National Stage application of International Application No. PCT/JP2017/019724, filed on May 26, 2017, which claims the benefit of Japanese Patent Application No. 2016-105788, filed May 27, 2016, the entire contents of which are all hereby incorporated herein by reference.

TECHNICAL FIELD

The present invention relates to a preparation method of a nickel-lithium metal composite oxide powder, a nickel-lithium metal composite oxide powder obtained by using the preparation method, a positive electrode active material formed thereof, a lithium ion battery positive electrode using the positive electrode active material, and a lithium ion battery.

BACKGROUND ART

Information terminal devices capable of being portably used outdoors, such as personal computers or mobile phones have spread significantly in accordance with the introduction of light and small-sized batteries having high capacity. A demand for batteries to be mounted on a vehicle exhibiting high performance and having high safety or durability has increased along the spreading of hybrid vehicles. In addition, electric cars have also been realized along with realization of a small size and high capacity for batteries to be mounted. Many corporations and research institutes have already started technological development of batteries to be mounted on information terminal devices or vehicles and there is intense competition therebetween. Lithium ion batteries with a lower cost are currently in strong demand along with the intensification of market competition regarding information terminal devices, hybrid cars, or EV cars, and the balance between the quality and the cost is the issue.

First, reduction in costs of members or materials configuring a product may be considered as means for decreasing manufacturing costs of a final industrial product. In lithium ion batteries, reduction in costs may also be considered in regards to a positive electrode, a negative electrode, an electrolyte, and a separator which are essential elements thereof. Among these, the positive electrode is a member in which a lithium-containing metal oxide called a positive electrode active material is disposed on an electrode. The reduction in cost of the positive electrode active material is essential for the reduction in cost of the positive electrode and the reduction in cost of the batteries.

Attention is currently focused on nickel-based active materials expected to have a high capacity as a positive electrode active material of a lithium ion battery. A composite metal oxide containing cobalt and aluminum in addition to lithium and nickel (NCA) is a typical example of high nickel-based active material. As a lithium source of a nickel-based active material such as NCA, lithium hydroxide is generally used.

Lithium carbonate is used as a lithium source when preparing a lithium cobalt oxide which is a representative of positive electrode active materials for lithium ion batteries, and in this case, the firing is normally performed at a decomposition temperature of lithium carbonate at the time of the firing. Meanwhile, when lithium carbonate is used and fired at a high temperature in the preparation of a high nickel-based positive electrode active material such as LNCAO, a problem causing a so-called cation mixing occurs. In order to avoid this problem, when preparing the high nickel-based positive electrode active material, lithium hydroxide is generally used (Japan Oil, Gas and Metals National Corporation, Annual Report 2012, p. 148 to 154). For lithium hydroxide, a material obtained by industrial synthesis with a reaction represented by the following formula by using lithium carbonate as a raw material is solely used ("Monthly Fine Chemical" November 2009, p. 81 to 82, CMC Publishing Co., Ltd.). The cost of the lithium hydroxide is, of course, higher than the cost of lithium carbonate which is a raw material thereof.

(Preparation of Lithium Hydroxide Using Lithium Carbonate as a Raw Material)

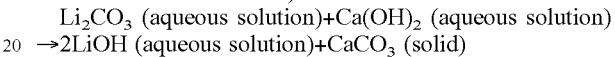

$Li_2CO_3$ (aqueous solution)+$Ca(OH)_2$ (aqueous solution) →2LiOH (aqueous solution)+$CaCO_3$ (solid)

As described above, demand for realization of high performance and reduction in cost of lithium ion batteries has increased and it is necessary to realize high performance and reduction in costs of members of lithium ion batteries and materials configuring the members. It is also necessary to realize high performance and reduction in cost of the positive electrode active material containing LNO in the same manner as described above.

Meanwhile, for the lithium ion batteries, high capacity is also required in addition to low cost, and particularly, a demand for improvement of a density of volume capacity is extremely strong. In order to increase a density of volume capacity, it is necessary that an electrode is more densely filled with an active material, but an increase in density has a limitation, in a case where particle size distribution is monodisperse. As a method for solving this problem, a method of using particles which are easily crushed or using a mixture of particles having different particle size distribution, that is, a so-called bimodal mixture is generally used.

A bimodal mixture is a particle mixture obtained by mixing small particles having a diameter which is approximately ½₀ to ⅒ of an average particle diameter of large particles, with the large particles at a ratio of approximately 8:2 to 6:4, and the bimodal mixture realizes an increase in filling density of particles, because gaps formed by the large particles are filled with the small particles. JP 2001-196097 A, for example, discloses a lithium secondary battery in which an inorganic oxide is used as a positive electrode active material, carbon is used as a negative electrode active material, the inorganic oxide which is the positive electrode active material or the carbon which is the negative electrode active material have two or more kinds of average particle diameters, and, when, a particle diameter of large particles is set as 1, a rate of a particle diameter of small particles is equal to or smaller than 0.3.

JP-A-2006-318926 discloses a positive electrode active material which is formed of lithium composite oxide particles represented by General Formula $Li_xM_{1-y}N_yO_{2-z}$, (in the formula, M represents Co, Ni, or Mn, N represents a transition metal element different from M or one or more kinds of elements selected from the group consisting of elements having atomic numbers 11 and greater; x represents a number in a range of 0.2≤x≤1.2, y represents a number in a range of 0≤y≤0.5, and z represents a number in a range of 0≤z≤1.0) or General Formula $Li_aMn_{2-b}N_bO_{4-c}$ (in the formula, N is identical to N described above, a represents a number in a range of 0<a<2.0, b represents a number in a range of 0≤b≤0.6, and c represents a number in a range of 0≤c≤2.0), the lithium composite oxide particles are formed of particles having two or more kinds of different average particle diameters in a range of an average particle diameter of 0.1 to 50 μm the number of peaks in particle size distribution of the lithium composite oxide particles is equal to or greater than 2, a particle diameter rate of a peak of the particles having a large particle diameter and a peak of the particles having a small particle diameter is equal to or greater than 1.4, a combination percentage of the lithium composite oxide particles having a large average particle diameter is 70 to 80% by mass and a combination percentage of the lithium composite oxide particles having a small average particle diameter is 20 to 30% by mass. In a case of preparing such a positive electrode active material, it is necessary to provide small particles having a diameter which is approximately ½₀ to ⅟₁₀ of an average particle diameter of large particles. For example, it is necessary that particles having an extremely small average particle diameter of approximately 1.5 μm are mixed with large particles having an average particle diameter of 15 μm.

In a case of preparing such a bimodal mixture, it is necessary to prepare particles having a small particle diameter in which an average particle diameter is smaller than 4 μm. However, in the general preparation of a positive electrode active material, particles having an average particle diameter of approximately smaller than 4 μm causes a problem of crystal growth between active material particles in a firing step or strong aggregates generated due to a residual lithium compound which becomes an adhesive between particles. In a case of using the lithium metal composite oxide as an active material for a lithium ion battery, a crushing step is generally performed after a firing step, because it is necessary to control a particle diameter to be in a predetermined particle diameter range. However, at this time, when strong aggregates are generated in a fired product, fine powder may be generated due to excessive crushing and battery characteristics thus deteriorate.

In addition, the weight of the particles of the active material having a small particle diameter is light, and accordingly, when a centrifuge separation method using a cyclone or the like is used at the time of recovery using airflow carrying after the crushing, recovery efficiency is deteriorated. Further, even when filter-type recovery using a bag filter is performed, a problem of clogging of a filter occurs, due to a small particle diameter.

RELATED ART DOCUMENT

Patent Document

[Patent Document 1] JP-A-2001-196097
[Patent Document 2] JP-A-2006-318926
[Non Patent Document 1] Japan Oil, Gas and Metals National Corporation, Annual Report 2012, p. 148 to 154
[Non Patent Document 2] "Monthly Fine Chemical" November 2009, p. 81 to 82, CMC Publishing Co., Ltd.

SUMMARY OF THE INVENTION

Problem that the Invention is to Solve

In a case of preparing a positive electrode active material having a small particle diameter for a lithium ion battery as described above, a lot of problems occurs due to crushing performed after firing, and thus, it is necessary to provide a preparation method in which the crushing is not necessary to be performed. The inventors have intensively studied to provide a preparation method of a positive electrode active material for a lithium ion battery, in which aggregates are not generated and crushing is not necessary to be performed after firing.

Means for Solving the Problem

As a result, the inventors have succeeded in preparing a nickel-lithium metal composite oxide powder having a small particle diameter, in which aggregates are not generated and crushing is not necessary to be performed after firing, by using lithium carbonate as a lithium source at the time of firing, and performing the firing at a temperature equal to or lower than a melting point of lithium carbonate. That is, the invention is as follows.

(Invention 1) A preparation method of a nickel-lithium metal composite oxide powder formed of a nickel-lithium metal composite oxide represented by Formula (1), in which lithium carbonate is used as a lithium source, $D_{0.001}$ indicating a cumulative percentage particle diameter showing the showing particle distribution is 0.8 μm to 3.0 μm, $D_{10}$ is 2.0 μm to 5.0 μm, $D_{50}$ is 2.0 μm to 6.5 μm, $D_{90}$ is 5.5 μm to 12.0 μm, and $D_{100}$ is 10.0 μm to 20.0 μm, the method including: the following Step 1 and/or Step 1' and Step 2.

(Step 1) A step of mixing a hydroxide of a metal M and/or an oxide of a metal M and lithium carbonate, with a precursor including a nickel hydroxide and/or a nickel oxide and a cobalt hydroxide and/or a cobalt oxide to obtain a mixture.

(Step 1') A step of mixing lithium carbonate, Leith a precursor including a nickel hydroxide and/or a nickel oxide, a cobalt hydroxide and/or a cobalt oxide, and a hydroxide of a metal M and/or an oxide of a metal M to obtain a mixture.

(Step 2) A step of firing the mixture obtained in Step 1 and/or Step 1' at a temperature lower than a melting point of lithium carbonate to obtain a fired product.

$$Li_aNi_{1-x-y}Co_xM_yO_b \qquad (1)$$

(In Formula (1), relationships of 0.90<a<1.10, 1.7<b<2.2, 0.01<x<0.15, and 0.005<y<0.10 are satisfied, M represents metals which include Al as an essential element and may include elements selected from Mn, W Nb, Mg, Zr, and Zn.)

(Invention 2) The preparation method of a nickel-lithium metal composite oxide powder according to Invention 1, in which a continuous furnace or a batch furnace is used in Step 2.

(Invention 3) The preparation method of a nickel-lithium metal composite oxide powder according to Invention 1 or 2, in which a firing furnace selected from a rotary kiln, a roller hearth kiln, and a muffle furnace is used in Step 2.

(Invention 4) The preparation method of a nickel-lithium metal composite oxide powder according to any one of Inventions 1 to 3, in which the nickel-lithium metal composite oxide obtained through Step 2 has no aggregate of particles.

(Invention 5) The preparation method of a nickel-lithium metal composite oxide powder according to any one of Inventions 1 to 4, further including: a step of crushing the fired product of the nickel-lithium metal composite oxide obtained through Step 2 and/or a step of sieving the fired product of the nickel-lithium metal composite oxide obtained through Step 2, after Step 2.

(Invention 6) A nickel-lithium metal composite oxide powder formed of a nickel-lithium metal composite oxide represented by Formula (1), in which $D_{0.001}$ indicating a cumulative percentage particle diameter showing the showing particle distribution is 0.8 μm to 3.0 μm, $D_{10}$ is 2.0 μm to 5.0 μm, $D_{50}$ is 2.0 μm to 6.5 μm, $D_{90}$ is 5.5 μm to 12.0 μm, and $D_{100}$ is 10.0 μm to 20.0 μm.

$$Li_aNi_{1-x-y}Co_xM_yO_b \quad (1)$$

(In Formula (1), relationships of 0.90<a<1.10, 1.7<b<2.2, 0.01<x<0.15, and 0.005<y<0.10 are satisfied, M represents metals which include Al as an essential element and may include elements selected from Mn, W, Nb, Mg, Zr, and Zn.)

Advantage of the Invention

When the preparation method of a nickel-lithium metal composite oxide powder of the invention is used, it is possible to prepare a nickel-lithium metal composite oxide powder having a small particle diameter, in which aggregates are not generated and crushing is not necessary to be performed after firing.

BRIEF DESCRIPTION OF THE DRAWINGS

FIG. 1 schematically shows a first example of a container used in Step 2 of the invention. (stereograph)

FIG. 2 schematically shows the first example of the container used in Step 2 of the invention. (top view)

FIG. 3 schematically shows an air supply passage and an air exhaust passage formed in the first example of the container used in Step 2 of the invention.

FIG. 4 schematically shows a second example of a container used in Step 2 of the invention. (stereograph)

FIG. 5 schematically shows the second example of the container used in Step 2 of the invention. (top view)

FIG. 6 schematically shows an air supply passage and an air exhaust passage formed in the second example of the container used in Step 2 of the invention.

FIG. 7 is an electron microscope image of a nickel-lithium metal composite oxide powder obtained in Example 1. (1,000 magnification)

FIG. 8 is an electron microscope image of the nickel-lithium metal composite oxide powder obtained in Example 1. (4,000 magnification)

FIG. 9 is an electron microscope image of a nickel-lithium metal composite oxide powder obtained in Example 2. (1,000 magnification)

FIG. 10 is an electron microscope image of the nickel-lithium metal composite oxide powder obtained in Example 2. (4,000 magnification)

FIG. 11 is an electron microscope image of the nickel-lithium metal composite oxide powder obtained in Comparative Example 1. (1,000 magnification)

FIG. 12 is an electron microscope image of the nickel-lithium metal composite oxide powder obtained in Comparative Example 1. (4,000 magnification)

FIG. 13 is an electron microscope image of the nickel-lithium metal composite oxide powder obtained in Comparative Example 2. (1,000 magnification)

FIG. 14 is an electron microscope image of the nickel-lithium metal composite oxide powder obtained in Comparative Example 2. (4,000 magnification)

BEST MODE FOR CARRYING OUT THE INVENTION

A powder formed of a nickel-lithium metal composite oxide represented by Formula (1) is obtained by a preparation method of the invention. In Formula (1), M represents metal elements which include Al as an essential element and may include a metal selected from Mn, W, Nb, Mg, Zr, and Zn. The amount of one or more kinds of the metal selected from Mn, W, Nb, Mg, Zr, and Zn which are arbitrary constituent elements may be arbitrarily set, as long as it is in a range not disturbing a function of the nickel-lithium metal composite oxide represented by Formula (1) as a nickel-based positive electrode active material.

$$Li_aNi_{1-x-y}Co_xM_yO_b \quad (1)$$

(In Formula (1), relationships of 0.90<a<1.10, 1.7<b<2.2, 0.01<x<0.15, and 0.005<y<0.10 are satisfied and M represents Al or Al containing the small amount of one or more kinds of metals selected from Mn, W, Nb, Mg, Zr, and Zn.)

The supplying of one or more kinds of the metal selected from Mn, W, Nb, Mg, Zr, and Zn to the nickel-lithium metal composite oxide may be performed in any steps of the preparation method of the invention. For example, the metal may be supplied as impurities contained in the raw material, may be supplied as auxiliary components in Step 1 or Step 1' which is the essential step, or may be supplied in any step.

In the invention, first, raw materials of the metals configuring the nickel-lithium metal composite oxide are mixed with each other in Step 1 and/or Step 1'. The obtained mixture is fired in Step 2 which will be described later to obtain a desired nickel-lithium metal composite oxide powder. Hereinafter, each step of the preparation method of the invention will be described.

(Step 1) This is a step of mixing a hydroxide of a metal M and/or an oxide of a metal M and lithium carbonate, with a precursor including a nickel hydroxide and/or a nickel oxide and a cobalt hydroxide and/or a cobalt oxide. The lithium carbonate is a raw material of the lithium hydroxide (normally, lithium hydroxide monohydrate). In the technology of the related art, the lithium hydroxide has been used as a raw material of the nickel-lithium metal composite oxide. When comparing the cost per unit weight, the lithium carbonate is more inexpensive than the lithium hydroxide, and when comparing the content of lithium per unit weight, the lithium carbonate contains lithium with higher concentration than that of lithium hydroxide monohydrate, and accordingly, the lithium carbonate is effectively used from a viewpoint of cost reduction. The mixing is performed by applying a shear force by using various mixers.

(Step 1') This is a mixing step of mixing lithium carbonate, with a precursor including a nickel hydroxide and/or a nickel oxide, a cobalt hydroxide and/or a cobalt oxide, and a hydroxide of a metal M and/or an oxide of a metal M. As described in Step 1, it is advantageous to use the lithium carbonate from a viewpoint of the manufacturing costs. The mixing is performed by applying a shear force by using various mixers.

The raw material mixture obtained in the mixing step of the invention is used in the following Step 2, A firing material used in Step 2 may be only the mixture prepared in Step 1, may be only the mixture prepared in Step 1' or may be a material obtained by further mixing the mixture prepared in Step 1 and the mixture prepared in Step 1' with each other.

(Step 2) This is a step of firing the mixture obtained in Step 1 and/or Step 1' in a firing furnace. The firing is performed at a temperature range equal to or lower than a melting point of lithium carbonate for 3 to 40 hours. A container for accommodating the mixture is placed in a firing atmosphere of the firing furnace and the mixture is accommodated in the container. A material of the container is not limited as long as it has excellent heat resistance and fire resistance, and a flat plate, a bowl, or a bath made of ceramic having heat resistance is generally used. A volume or a shape of the container can be freely and suitably designed in accordance with the amount of the mixture or the structure of the firing furnace. A most typical shape of the container used in the invention is a ceramic container formed of a container main body having a square tray shape and a lid having a flat plate shape. In the invention, the square-shaped ceramic container may be installed alone in the firing furnace, the square-shaped ceramic containers may be installed to be linked to each other in a horizontal direction, or the square-shaped ceramic containers may be overlapped in the firing furnace in a vertical direction.

Gas flowing into the container from an air supply passage is not limited as long as it is gas having a composition of promoting an oxidation reaction of a metal included in the mixture which is a material to be fired. The oxidized gas is preferably oxygen-containing gas and more preferably pure oxygen, air, mixed gas obtained by adding oxygen to air; or gas obtained by adding oxygen to inert gas such as nitrogen, argon, or helium. The oxidized gas is heated to a temperature suitable for firing conditions, when the oxidized gas reaches the inner portion of the container through the air supply path.

The oxidized gas is discharged from an end portion of a pipe positioned on an air supply port of the container. The oxidized gas comes into contact with a surface of the mixture facing the air supply port of the container along with fluid pressure. The expression "along with fluid pressure" does not mean that the oxidized gas once flowed into the firing container comes into contact with the surface of the mixture due to diffusion, but means that a flow of the oxidized gas reaches the surface of the mixture from the end portion of the pipe. The position of the end portion of the air supply pipe is determined as a position so that the oxidized gas comes into contact with the surface of the mixture in the state described above. The end portion of the pipe can also be expanded in order to cause the oxidized gas to evenly reach a wider surface.

In Step 2 of the invention, an air exhaust port is also formed in the container. The air exhaust port is provided at a position where gas accumulated in the container in accordance with a progress of firing is not mixed to a discharge flow of newly flowing oxidized gas and flows to the outside of the container by convection flow, diffusion, or suction, preferably, a position in the container furthest from the air supply port or a space in the container separated from an inlet portion of the oxidized gas. As described above, in Step 2 of the invention, the firing is performed while controlling the flow or the composition of the gas in the firing atmosphere.

A Preferable example of the container used in Step 2 of the invention will be described with reference to FIG. 1, FIG. 2, and FIG. 3. FIG. 1 (stereograph) and FIG. 2 (top view) are examples in which an air supply port (1) and an air exhaust port (2) are provided on side surfaces of a container main body (3). An air supply pipe (not shown) is linked and opened to the air supply port (1) and heated oxidized gas flows from the air supply port (1) to a space in the container. An air supply passage (flow passage (6) of FIG. 3) is formed here. Meanwhile, gas accumulated in the container in accordance with a progress of firing is discharged from the air exhaust port (2) into the firing furnace (gas is discharged into a space in the firing furnace). An air exhaust passage (flow passage (7) of FIG. 3) is formed here. A lid (4) completely covers the upper portion of the container main body and the air supply port (1) and the air exhaust port (2) are separated from each other, and thus, the air supply passage and the air exhaust passage are not overlapped with each other. As described above, the atmosphere in the container is controlled by a composition, a concentration, a temperature, and an exhaust amount of the oxidized gas.

Another preferable example of the container used in Step 2 of the invention will be described with reference to FIG. 4, FIG. 5, and FIG. 6. FIG. 4 (stereograph) and FIG. 5 (top vie a pies in which a container main body (3) and a partition plate (5) are provided and an air supply port (1) and an air exhaust port (2) are provided on a side surface of the container main body (3). An air supply pipe (not shown) is linked and opened to the air supply port (1), and heated oxidized gas flows from the air supply port (1) to a space in the container, is introduced by the partition plate (5), and spreads in a space in contact with a side surface of the partition plate (5). An air supply passage (flow passage (8) of FIG. 6) is formed here. Meanwhile, gas accumulated in the container in accordance with a progress of firing is discharged from the air exhaust port (2) into the firing furnace. An air exhaust passage (flow passage (9) of FIG. 6) is formed here. The spaces formed by the lid (4) and the container main body (3) are substantially divided by the partition plate (5), and thus, the air supply passage and the air exhaust passage are not completely overlapped with each other. As described above, the atmosphere in the container is controlled by a composition, a concentration, a temperature, and an exhaust amount of the oxidized gas.

After starting a temperature increase, the firing is performed at a temperature equal to or lower than a melting point of lithium carbonate, specifically, in temperature range equal to or lower than 723° C., preferably in temperature range of 500° C. to 700° C. When the firing temperature is lower than 500° C., a large amount of unreacted lithium carbonate remains, and production efficiency of the nickel-lithium metal composite oxide powder is deteriorated. In addition, when the nickel-lithium metal composite oxide powder prepared by firing at an excessively low temperature as described above is used in the positive electrode active material for a lithium ion battery, sufficient battery characteristics are not obtained. When the firing temperature exceeds the melting point of lithium carbonate, the amount of unreacted lithium carbonate decreases, but strong aggregates between the particles are generated, and this causes excessive crushing or fine powder generated due to the excessive crushing. Thus, when the nickel-lithium metal composite oxide powder described above is used in the positive electrode active material for a lithium ion battery, sufficient battery characteristics are not obtained.

In Step 2, the firing is performed at the firing temperature for 3 to 40 hours, preferably 5 to 35 hours. When the firing time is shorter than 3 hours, a large amount of unreacted lithium carbonate remains, and production efficiency of the nickel-lithium metal composite oxide powder is deteriorated. In addition, when the nickel-lithium metal composite oxide powder prepared by firing at an excessively low temperature as described above is used in the positive electrode active material for a lithium ion battery, sufficient battery characteristics are not obtained. The firing time longer than 40 hours is not economically preferable, because a consumption rate of lithium carbonate does not increase. The fired product subjected to Step 2 can further fired at a temperature equal to or higher than the melting point of lithium carbonate. Crystal growth of the nickel-lithium metal composite oxide can be promoted by performing the firing at a temperature equal to or higher than the melting point of lithium carbonate, after performing the firing at a temperature equal to or lower than the melting point of lithium carbonate.

The firing furnace used in Step 2 is not limited, as long as it has a structure in which the oxidized gas flows to and is discharged from the container described above. A preferable firing furnace is a continuous furnace or a hatch furnace in which a comparatively large amount of mixture of raw materials for commercial production can be fired. A rotary kiln, a roller hearth kiln, or a muffle furnace can be used, for example.

At the time of the end of Step 2, lithium carbonate is almost consumed and nickel-lithium metal composite oxide is formed. In addition, in this aspect, aggregates are not generated and a powder state is maintained. The performance of the nickel-lithium metal composite oxide powder of the invention can be confirmed by the following evaluation.

(Presence or Absence of Aggregates)

The obtained nickel-lithium metal composite oxide powder is confirmed by cracking using fingers and visually to confirm presence or absence of aggregates. A case where cracking can be easily performed using fingers and aggregates are not observed, is evaluated as "no aggregates".

(Presence or Absence of Fine Powder)

When the obtained nickel-lithium metal composite oxide powder is observed using a scanning electron microscope, it is possible to confirm that fine powder is not generated.

(Particle Diameter Distribution)

When particle diameter distribution of the obtained nickel-lithium metal composite oxide powder is measured by a laser scattering type particle diameter distribution system, it is possible to confirm that fine powder due to excessive crushing is not generated and coarse particles due to aggregates are not generated either.

Aggregates are not substantially observed in the fired product obtained in Step 2, and thus, the crushing is not necessary to be performed, but it is possible to perform a step of arbitrarily performing the crushing using a ball mill or a mortar after Step 2. In addition, it is also possible to perform a step of sieving the particles of the fired product obtained in Step 2, after Step 2. Both the crushing step and the sieving step may be performed. By performing the crushing step and/or the sieving step, it is possible to prepare fine particulate nickel-lithium metal composite oxide powder in which filling properties or particle size distribution is adjusted. The particle size distribution of the nickel-lithium metal composite oxide powder obtained in the invention is comparatively uniform. $D_{0.001}$ indicating a cumulative percentage particle diameter showing the particle distribution based on volume is 0.8 µm to 3.0 µm, $D_{10}$ is 2.0 µm to 5.0 µm, $D_{50}$ is 2.0 µm to 6.5 µm, $D_{90}$ is 5.5 µm to 12.0 µm, and $D_{100}$ is 10.0 µm to 20.0 µm. Preferably, $D_{0.001}$ is 1.0 µm to 3.2 µm, $D_{10}$ is 2.2 µm to 5.0 µm, $D_{50}$ is 2.0 µm to 6.0 µm, $D_{90}$ is 5.5 µm to 11.0 µm, and $D_{100}$ is 10.0 µm to 18.0 µm.

The nickel-lithium metal composite oxide powder obtained in the invention is a new material with respect to a conventional product, from a viewpoint of showing the particle size distribution described above. The nickel-lithium metal composite oxide powder obtained in the invention is innovative, from viewpoints of being used as it is as a positive electrode active material for a lithium ion battery, without being crushed, and avoiding cracking of particles or generation of fine powder which are problems of the crushing step of the method in the related art.

In the invention, it is possible to provide a nickel-lithium metal composite oxide powder having a suitable small particle diameter as a positive electrode active material of a lithium ion battery with excellent efficiency, by using lithium carbonate as a raw material. A positive electrode active material of a lithium ion battery may be configured with only the nickel-lithium metal composite oxide powder of the invention, or other positive electrode active materials for a lithium ion secondary battery may be mixed with the nickel-lithium metal composite oxide powder of the invention. For example, a material obtained by mixing 5 to 40 parts by weight of the nickel-lithium metal composite oxide powder of the invention and 60 to 95 parts by weight of a positive electrode active material for a lithium ion secondary battery having a large particle diameter other than the material used in the invention with each other so as to have total 100 parts by weight can be used as a positive electrode active material. In a case of preparing a positive electrode of a lithium ion secondary battery, a slurry of a mixture for a positive electrode is prepared by adding a positive electrode active material containing the nickel-lithium metal composite oxide powder of the invention, a conductive assistant, a binder, and an organic solvent for dispersion and coating the slurry onto the electrode to prepare a positive electrode for a lithium ion secondary battery.

EXAMPLES

Example 1

A nickel-lithium metal composite oxide powder was prepared through Step 1 and Step 2.

(Step 1) An aluminum hydroxide and lithium carbonate were mixed with a precursor having $D_{50}$ of 3.9 µm which is configured with a nickel hydroxide and a cobalt hydroxide prepared from an aqueous solution of a nickel sulfate and a cobalt sulfate, with a mixer by applying a shear force. The aluminum hydroxide was prepared so that the amount of aluminum with respect to the amount of the precursor becomes 2 mol % and the lithium carbonate was prepared so that a molar ratio thereof with respect to the total nickel-cobalt-aluminum becomes 1.025, respectively.

(Step 2) 60 g of the mixture obtained in Step 1 was placed on an alumina ceramic board and installed in a tube furnace. Temperature rising was started while supplying oxygen from one side of the tube furnace at a supply rate of 5 L per minute. The temperature was increased to 690° C. at a rate of temperature rise of 155° C. per hour and was maintained at 690° C. for 10 hours, and then, the cooling was performed to room temperature. By doing so, the nickel-lithium metal composite oxide powder was obtained. Scanning electron microscope images of the fired product are shown in FIG. 7 and FIG. 8 and results of measurement of particle size distribution are shown in Table 1.

(Measurement of Particle Diameter Distribution)

In a case where aggregates of particles are observed in the obtained nickel-lithium metal composite oxide powder, the nickel-lithium metal composite oxide powder was sieved by using a standard sieve having a nominal opening size of 53 µm defined based on JIS Z 8801-1:2006, after performing the crushing using a mortar, and in a case where aggregates of particles are not generated, the nickel-lithium metal composite oxide powder was sieved as it is. The cumulative distribution corresponding to the particle size distribution of the nickel-lithium metal composite oxide particles passed through the sieve was measured by using a laser scattering-type particle size distribution measuring device LA-950 manufactured by Horiba, Ltd., and $D_{0.001}$, $D_{10}$, $D_{50}$ (median diameter), $D_{90}$, and $D_{100}$ based on volume were acquired.

Example 2

The firing was performed in the same manner as in Example 1, except that a precursor having $D_{50}$ is 1.85 μm is used as the precursor. Scanning electron microscope images of the fired product are shown in FIG. 9 and FIG. 10 and results of measurement of particle size distribution are shown in Table 1.

Comparative Example 1

This is an example in which the firing conditions of Step 2 of Example 1 is changed. That is, 60 g of the mixture obtained in Step 1 was placed on an alumina ceramic board and installed in a tube furnace. Temperature rising was started while supplying oxygen from one side of the tube furnace at a supply rate of 5 L per hour. The temperature was increased to 780° C. at a rate of temperature rise of 155° C. per hour and was maintained at 780° C. for 5 hours, and then, the cooling was performed to room temperature. By doing so, the nickel-lithium metal composite oxide was obtained. Since the fired product were rigidly aggregated, the observation using a scanning electron microscope and the measurement of the particle size distribution were performed, after performing the crushing using a mortar. Electron microscope images are shown in FIG. 11 and FIG. 12 and results of measurement of particle size distribution are shown in Table 1.

Comparative Example 2

This is an example in which the firing conditions of Step 2 of Example 1 is changed. That is, 60 g of the mixture obtained in Step 1 was placed on an alumina ceramic board and installed in a tube furnace. Temperature rising was started while supplying oxygen from one side of the tube furnace at a supply rate of 5 L per hour. The temperature was increased to 810° C. at a rate of temperature rise of 155° C. per hour and was maintained at 810° C. for 15 hours, and then, the cooling was performed to room temperature, By doing so, the nickel-lithium metal composite oxide was obtained. Since the fired product were rigidly aggregated, the observation using a scanning electron microscope and the measurement of the particle size distribution were performed, after performing the crushing using a mortar. Electron microscope images are shown in FIG. 13 and FIG. 14 and results of measurement of particle size distribution are shown in Table 1.

TABLE 1

| | Step 1 Median diameter of precursor ($D_{50}$) μm | Step 2 Firing temperature ° C. Time (h) | Nickel-lithium metal composite oxide powder | | | | | | |
|---|---|---|---|---|---|---|---|---|---|
| | | | Composition | Aggregates of particle | Particle size distribution (μm) | | | | |
| | | | | | $D_{0.001}$ | $D_{10}$ | $D_{50}$ | $D_{90}$ | $D_{100}$ |
| EXAMPLE 1 | 3.90 | 690 (10) | $Li_{1.025}Ni_{0.86}Co_{0.12}Al_{0.02}O_2$ | Absent | 1.5 | 3.6 | 5.7 | 8.9 | 17.4 |
| EXAMPLE 2 | 1.85 | 690 (10) | $Li_{1.025}Ni_{0.86}Co_{0.12}Al_{0.02}O_2$ | Absent | 1.2 | 2.7 | 4.7 | 7.5 | 15.2 |
| COMPARATIVE EXAMPLE 1 | 3.90 | 780 (5) | $Li_{1.025}Ni_{0.86}Co_{0.12}Al_{0.02}O_2$ | Present | 0.3 | 1.9 | 6.1 | 18.5 | 133.0 |
| COMPARATIVE EXAMPLE 2 | 3.90 | 810 (15) | $Li_{1.025}Ni_{0.86}Co_{0.12}Al_{0.02}O_2$ | Present | 0.6 | 6.7 | 19.6 | 37.8 | 88.5 |

In Comparative Example 1 and Comparative Example 2, the firing was performed at a temperature higher than the melting point of lithium carbonate. In Comparative Example 1, $D_{100}$ shows a large value which is 133, and thus, it is thought that a comparatively large amount of aggregated particles is generated. From the electron microscope images, it is thought that a large amount of fine powder considered as a material generated during the crushing performed for loosening the strong aggregates, is generated, and this is confirmed by $D_{0.001}$ showing a small value of 0.3 μm.

In Comparative Example 2, although the crushing was performed, a nickel-lithium metal composite oxide having uneven particle size distribution to a large particle diameter side was obtained. For example, $D_{50}$ shows a large value close to 20 μm. The shape of the precursor particles is not observed in the electron microscope image and the shape of indeterminately aggregated parties is observed, and thus, aggregates between particles are confirmed.

With respect to this, in Example 1, although the crushing was not performed after the firing, cracks and fine powder were not completely observed in the electron microscope image. A median diameter: 5.7 μm of Example 1 is not significantly different from a median diameter: 3.9 μm of a precursor, and from this point, it is found that aggregation of positive electrode active material particles is prevented. The particle diameters of D0.01, D10, D50, and D100 do not drastically change, and thus, it is found that the lithium metal composite oxide particles having comparatively arranged particle sizes are generated.

In the same manner as in Example 2, the particle system of the precursor is comparatively maintained and metal composite oxide particles having comparatively arranged particle sizes are generated. It is found that, the fine powder is slightly observed in the electron microscope image, but large aggregated particles are observed, and the shape of the precursor is maintained in an excellent manner.

As described above, in the preparation method of a nickel-lithium metal composite oxide powder of the invention, the firing is performed at a temperature at a temperature equal to or lower than the melting point of lithium carbonate by using lithium carbonate as a lithium raw material, and thus, it is possible to efficiently prepare a nickel-lithium metal composite oxide powder having a comparatively small particle diameter and showing comparatively even particle size distribution. Such a nickel-lithium metal composite oxide powder can be used as it is as a positive electrode active material, and thus, excessive crushing of particles which is the problem in the related art may not occur. It is possible to provide a nickel-lithium metal composite oxide powder for a positive electrode active material for a lithium ion battery without fine powder and cracks of particles, by the method of the invention.

The invention is advantageous as a method of providing a positive electrode active material for a lithium ion battery exhibiting high performance at low cost. The nickel-lithium metal composite oxide powder obtained in the invention and a lithium ion battery using this contribute to improvement of performance of portable information terminals or a battery vehicles. Since excessive crushing of particles does not occur; it is possible to provide a preparation method of a nickel-lithium metal composite oxide powder having a small particle diameter, in which fine powder and cracks of particles are not generated.

The invention claimed is:

1. A preparation method of a nickel-lithium metal composite oxide powder formed of a nickel-lithium metal composite oxide represented by Formula (1), wherein the nickel-lithium metal composite oxide powder has a cumulative percentage particle diameter distribution having a $D_{0.001}$ which is 0.8 μm to 3.0 μm, a $D_{10}$ which is 2.0 μm to 5.0 μm, $D_{50}$ which is 2.0 μm to 6.5 μm, a $D_{90}$ which is 5.5 μm to 12.0 μm, and $D_{100}$ which is 10.0 μm to 20.0 μm, wherein $D_{50} > D_{10}$, the method comprising:

(Step 1) mixing lithium carbonate with a precursor and with a hydroxide of a metal M and/or an oxide of a metal M, wherein the precursor includes Ni in the form of nickel hydroxide and/or nickel oxide, Co in the form of cobalt hydroxide and/or cobalt oxide to obtain a mixture; and (Step 2) firing the mixture obtained in Step 1 at a temperature lower than a melting point of the lithium carbonate to obtain a fired product $$Li_aNi_{1-x-y}Co_xM_yO_b \quad (1)$$

wherein, in Formula (1), relationships of 0.90<a<1.10, 1.7<b<2.2, 0.01<x<0.15, and 0.005<y<0.10 are satisfied, and wherein M includes Al as an essential element and may include elements selected from the group consisting of Mn, W, Nb, Mg, Zr, and Zn, or (Step 1') mixing lithium carbonate with a precursor, wherein the precursor includes Ni in the form of nickel hydroxide and/or nickel oxide, Co in the form of cobalt hydroxide and/or cobalt oxide, and metal M in the form of hydroxide of the metal M and/or oxide of the metal M to obtain a mixture; and (Step 2) firing the mixture obtained in Step 1' at a temperature lower than a melting point of the lithium carbonate to obtain a fired product $$Li_aNi_{1-x-y}Co_xM_yO_b \quad (1)$$

wherein, in Formula (1), relationships of 0.90<a<1.10, 1.7<b<2.2, 0.01<x<0.15, and 0.005<y<0.10 are satisfied, and wherein M includes Al as an essential element and may include elements selected from the group consisting of Mn, W, Nb, Mg, Zr, and Zn, or (Step 1) mixing lithium carbonate with a precursor and with a hydroxide of a metal M and/or an oxide of a metal M, wherein the precursor includes Ni in the form of nickel hydroxide and/or nickel oxide, Co in the form of cobalt hydroxide and/or cobalt oxide to obtain a mixture; and (Step 1') mixing the lithium carbonate with a precursor, wherein the precursor includes Ni in the form of nickel hydroxide and/or nickel oxide, Co in the form of cobalt hydroxide and/or cobalt oxide, and metal M in the form of hydroxide of the metal M and/or oxide of the metal M to obtain a mixture; and (Step 2) firing the mixture obtained in Step 1 and Step 1' at a temperature lower than a melting point of the lithium carbonate to obtain a fired product $$Li_aNi_{1-x-y}Co_xM_yO_b \quad (1)$$

wherein, in Formula (1), relationships of 0.90<a<1.10, 1.7<b<2.2, 0.01<x<0.15, and 0.005<y<0.10 are satisfied, and wherein M includes Al as an essential element and may include elements selected from the group consisting of Mn, W, Nb, Mg, Zr, and Zn, wherein a crushing and/or pulverizing step is not necessary to be performed after firing because the nickel-lithium metal composite oxide obtained through Step 2 has no aggregate of particles.

2. The preparation method of claim 1, wherein the firing temperature is from 500° C. to 700° C.

3. The preparation method of claim 1, wherein a continuous furnace or a batch furnace is used in Step 2.

4. The preparation method of claim 1, wherein a firing furnace selected from a rotary kiln, a roller hearth kiln, and a muffle furnace is used in Step 2.

5. The preparation method of claim 1, further comprising:
a step of sieving the fired product of the nickel-lithium metal composite oxide obtained through Step 2, after Step 2.

* * * * *